Oct. 31, 1944.   R. SHEPPARD   2,361,881
RELIEF VALVE
Filed Oct. 10, 1942

Inventor:
Raymond Sheppard,
by Harry E. Dunham
His Attorney.

Patented Oct. 31, 1944

2,361,881

UNITED STATES PATENT OFFICE 2,361,881

RELIEF VALVE

Raymond Sheppard, Niskayuna, N. Y., assignor to General Electric Company, a corporation of New York Application October 10, 1942, Serial No. 461,555

1 Claim. (Cl. 137—53)

The present invention relates to relief valves for relieving fluid from a system under pressure whenever the pressure exceeds a certain predetermined value. Difficulties have heretofore been experienced with such valve due to chattering of the movable valve member and the considerable noise created thereby in power plants.

The object of my invention is to provide an improved construction of relief valves whereby the aforementioned drawbacks are substantially eliminated.

This is accomplished in accordance with my invention by the provision of a relief valve with a movable valve member of the piston type and a dashpot connected to the movable valve member to dampen pulsations thereof due to pulsations of the pressure to be relieved. The dashpot is arranged to offer different resistances to movement in opposite directions.

For a better understanding of what I believe to be novel and my invention, attention is directed to the following description and the claims appended thereto in connection with the accompanying drawing.

Figure 1:
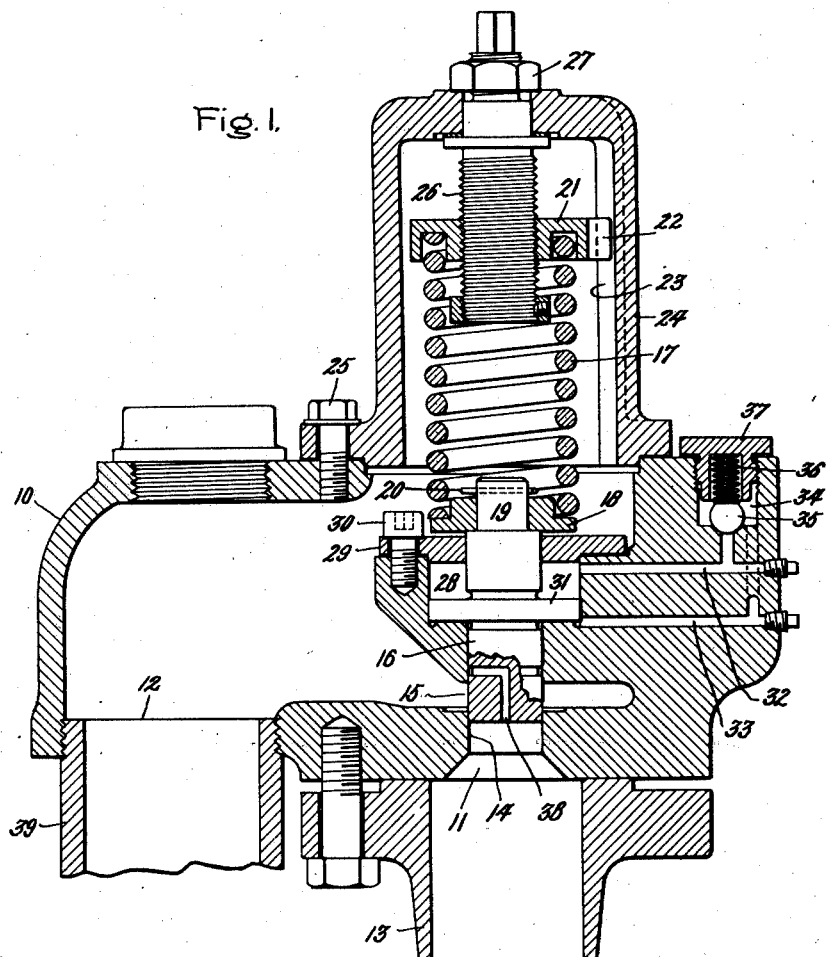
Figure 2:
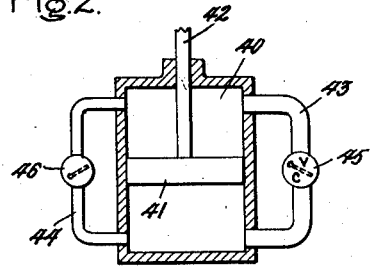

In the drawing Fig. 1 illustrates a sectional view of a relief valve embodying my invention; and Fig. 2 shows diagrammatically a modification of a part of Fig. 1.

The arrangement shown in Fig. 1 comprises a casing 10 forming an inlet opening 11 and an outlet or discharge opening 12. The inlet opening is connected to a system containing fluid under pressure, in the present instance indicated by a conduit 13 flanged to the casing 11. A cylindrical channel 14 with an annular recess or port 15 formed in the casing 10 connects the inlet 11 to the outlet 12. The flow of fluid through the cylindrical channel or cylinder is controlled by a piston type movable valve member or plunger 16 slidably arranged within the cylinder 14 and normally biased into closed position, as shown, by means including a compression spring 17. The lower end of said spring engages a spring plate 18 held on a shouldered extension or stem 19 of the piston 16 by means including a cotter pin 20. The upper end of the spring 17 engages an upper spring plate 21 which has a lateral projection 22 engaging a guide 23 on the casing. In the present instance the guide 23 is formed on a cup-shaped casing cover 24 secured to the casing by a plurality of bolts 25. The spring plate 21 is threaded onto a bolt 26 fastened to the cover 24 by means including a nut 27. Loosening of the nut 27 and rotation of the bolt 26 cause the spring plate 21 to move axially on the bolt 26, thus changing the compression of the spring 17.

An intermediate portion of the piston stem 19 projects through a cylindrical chamber or dashpot cylinder 28 formed in part by the casing 10 and including an upper cover plate 29 secured to the casing by bolts 30 and having a central bore in fluid-sealing engagement with the stem 19. A dashpot piston 31 is secured to, in the present instance integrally formed on, the intermediate portion of the stem 19 and slidably arranged within the dashpot cylinder 28. Upon movement of the piston 31 in the dashpot cylinder 28 fluid is displaced from the upper to the lower side of the piston 31 in two distinct forms. One form of displacement of fluid is due to leakage along the wall of the cylinder 28 from the upper side to the lower side of the piston 31. This displacement or leakage of fluid along the cylinder wall takes place during both upward and downward travel of the piston 31. Another form of displacement of fluid is accomplished by the provision of a bypass between the upper and lower ends of the cylinder 28. This bypass in the present example is established by channels 32 and 33 connecting the upper and lower ends of the cylinder 28 to a check valve chamber 34 formed in the casing 10. A ball-type valve member 35 is disposed in the chamber 34 and biased towards a seat connecting the chamber to the channel 32 by means of a compression spring 36 held in a plug 37 screwed into an opening of the casing 10. The valved bypassed channel including the channels 32, 33 and the check valve 35, 36 permits displacement of fluid only from the upper side of the piston 31 to the lower side and does not permit displacement from the lower to the upper side of the piston 31. Thus, upon upward movement of the piston 31 fluid may be displaced from the upper to the lower side thereof by both forms, that is, by leakage of fluid along the piston 31 and bypassing of fluid through the valved bypassed channel. Upon downward movement of the piston 31, however, fluid is displaced from the lower side of the piston to the upper side thereof in the form of leakage only along the dashpot cylinder 28. Thus, the dashpot arrangement as shown forms a small resistance against upward movement of the dashpot piston 31 and the plunger or piston 16 connected thereto and a considerable resistance against downward movement of the dashpot piston 31 permitting the piston 31 and the plunger 16 to move more rapidly in the upward than in the downward direction. The dashpot cylinder 28 in the arrangement shown is filled with the same fluid as that in the pressure system 13. If the latter contains oil the cylinder 28 is filled with oil. Oil is conducted to the cylinder 28 by leakage along the walls of the cylinder 14. Fluid leaking along the lower end of the walls 14 is discharged through the annular port 15 to the outlet 12. In order to effect leakage along the upper wall portions of the cylinder 14 to the dashpot a channel 38 is formed in the piston 16 connecting the inlet 11 to the upper wall of the cylinder 14 at a point above the annular port 15. During operation, fluid such as oil under pressure passes from the inlet 11 through the channel 38 and partly leaks upward along the wall of the cylinder 14 into the dashpot cylinder 28 until the latter and the channels connected thereto are substantially filled with such fluid.

A sudden considerable increase in pressure in the system 13 forces the movable valve member, that is, the piston 16, upward against the biasing force of the spring 17 and the restraining action of the dashpot 28, 31. The restriction of the dashpot, as pointed out above, is small with regard to upward movement of the piston 31 because the fluid contained above the piston may readily pass through the valved channels 32, 33 to the lower side of the piston 31. As the piston 16 passes upward beyond the lower edge of the port 15, fluid is discharged from the system 13 through the inlet 11 of the relief valve and the port 15 to its outlet 12, whence the fluid may be returned to a reservoir through a conduit 39 connected to the outlet 12. Upon discharge of fluid from the system 13 through the relief valve the pressure in the system drops and as it reaches a predetermined value the movable valve member 16 is forced downward into closing position by action of the spring 17. This downward movement is considerably retarded by the dashpot 28, 31 which, as pointed out above, forms a considerable restriction against downward movement of the piston 16. A valve according to my invention may be moved from closing to full opening position in a fraction of a second while it may take six seconds to move the valve from opening to closing position.

The dashpot due to its damping effect prevents opening of the valve in response to short pulsations of the fluid pressure in the system 13. If, however, a rapid succession of such pressure variations takes place in the system 13 the movable valve member may be moved to opening position to relieve some of the fluid under pressure. This is due to the fact that it takes the dashpot piston 31 a shorter period to move in upward direction than it takes the piston to return to its lower end position, engaging the bottom in the cylinder 28. Thus, in case of a succession of pressure impulses a first pressure impulse may force the valve member 16 upward a certain distance and the succeeding impulse, reaching its peak before the piston 16 has been returned to its original position, may move the piston 31 further upward until a certain number of such impulses effect opening of the relief valve by moving the piston 16 up beyond the lower edge of the port 15.

In the arrangement of Fig. 1 the restriction through the bypass channel 32, 33 of the dashpot 28, 31 may be controlled by adjusting the plug 37 on the casing to vary the biasing force of the spring 36 for the ball-type valve member 35. This permits variation of the damping effect with regard to upward movement of the dashpot piston 31. In the diagrammatic view of Fig. 2 I have shown a dashpot arrangement which might be used in place of the dashpot arrangement in Fig. 1, permitting adjustment of the damping effect with regard to both upward and downward movement of the dashpot piston. The arrangement of Fig. 2 comprises a dashpot cylinder 40 having a piston 41 movably disposed therein and connected to a stem 42 corresponding to the stem 19 in Fig. 1. The upper and lower ends of the cylinder 40 are connected by two conduits or channels, a wider channel 43 and a narrower channel 44. The wider channel 43 corresponds to the channel 32, 33 of Fig. 1, and includes a ball-type check valve 45 corresponding to the check valve 35, 36 of Fig. 1. This wider valved channel permits displacement of fluid only from the upper side of the piston 41 to the lower side thereof. The narrower channel or conduit 44 includes a check valve 46 of small size arranged to permit displacement of fluid from the lower to the upper side only of the piston 41. The check valves 45 and 46 may be of the same construction as the check valve 35, 36 in Fig. 1, permitting adjustment to control displacement of fluid in either direction between the upper and lower sides of the piston 41.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States, is:

Relief valve comprising a casing having an inlet and an outlet and forming a cylindrical bore with a port for connecting the inlet to the outlet, a plunger slidably disposed in the bore to control the port, a cylindrical dashpot chamber in alignment with the bore, a piston secured to the plunger and slidably disposed in the chamber, adjustable spring means normally biasing the plunger into an end position in which the piston engages an end wall of the chamber and the plunger covers the port, means for conducting fluid from the inlet to said cylindrical chamber including clearance space provided between the plunger and the bore and a channel in the plunger connecting the inlet side of the plunger to the side wall of the plunger at a point between the port and the piston, and a check valve controlled bypass connecting the ends of the chamber to effect substantial dampening of the valve in one direction only.

RAYMOND SHEPPARD.